May 27, 1924.
A. L. GRAY
SAW
Filed Jan. 28, 1922
1,495,407
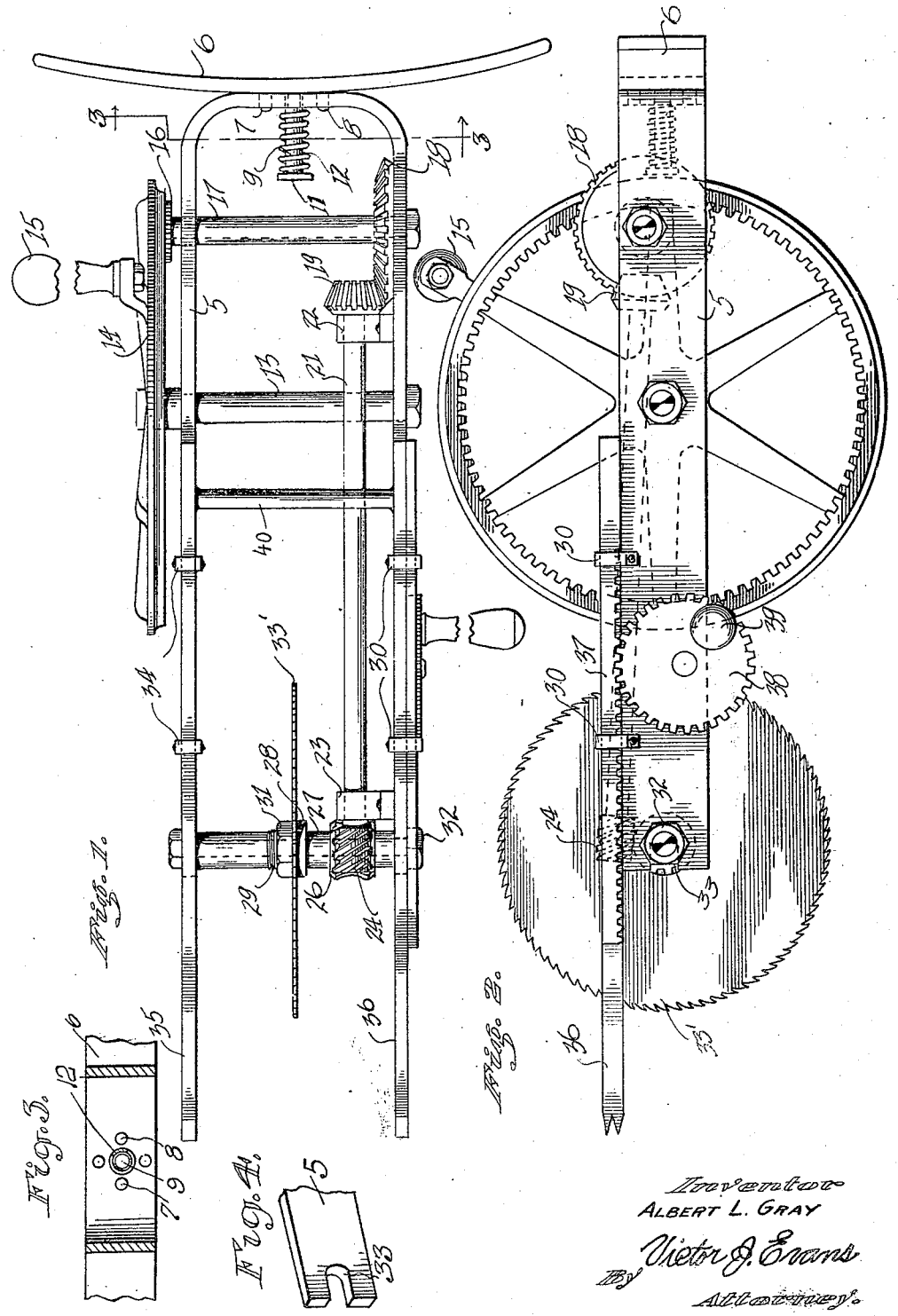
Inventor
ALBERT L. GRAY Patented May 27, 1924.

1,495,407

UNITED STATES PATENT OFFICE.

ALBERT L. GRAY, OF SANGER, CALIFORNIA.

SAW.

Application filed January 28, 1922. Serial No. 532,430.

*To all whom it may concern:*

Be it known that I, ALBERT L. GRAY, a citizen of the United States, residing at Sanger, in the county of Fresno and State of California, have invented new and useful Improvements in Saws, of which the following is a specification.

This invention relates to improvements in manually operated saws.

The principal object of this invention is to produce a saw, which will be of general utility and one which may be operated with a minimum amount of manual effort.

A further object is to produce a saw of this character which will be cheap to manufacture and one which may be used by various trades to accomplish sawing operations.

A still further object is to produce means whereby saws may be quickly changed and new saws inserted as for the sawing of metal.

Another object of this invention is to produce a saw which may be used as above mentioned, but in various positions.

Other objects and advantages will be apparent during the course of the following description.

In the accompanying drawings forming a part of this specification, and in which like numerals are employed to designate like parts throughout the same, Fig. 1 is a plan view of my saw and associated parts, and Fig. 2 is a side elevation of Figure 1, Figure 3 is a detail sectional view on line 3—3 of Figure 1.

Figure 4 is a perspective view of the extreme end of one of the legs of the saw frame.

It is my purpose to produce a hand saw which may be operated with a circular motion rather than a back and forth motion as is common with ordinary hand saws. This I propose to accomplish by using a series of gears properly proportioned so as to accomplish the sawing operation without undue fatigue on the part of the operator.

In the accompanying drawings wherein for the purpose of illustration is shown a preferred embodiment of my invention, the numeral 5 designates a U-shaped frame having a breast-plate 6, rotatably attached thereto. This breast-plate 6 is provided with lugs 7 and 8, which are adapted to enter openings in the head of the U-shaped frame 5, for the purpose of preventing rotation of the breast-plate 6.

A stud 9 is securely attached to the breast-plate 6 and passes through the U-shaped member 5 and is provided at its free end with a head 11. A coil spring 12 is mounted upon the stud 9 between the head 11 and the U-shaped member 5. This spring is of the expansible type and serves to hold the breast-plate 6 against the U-shaped frame 5 until manually withdrawn for the purpose of rotating the breast-plate with relation to the U-shaped member.

There are additional openings in the U-shaped member 5 at right angles to those first mentioned so that as the breast-plate 6 is turned at right angles to the position shown at Figure 1, the lugs 7 and 8 will enter the openings to hold the breast-plate in its new position.

A shaft 13 is rigidly mounted in the U-shaped member 5 and is adapted to carry an internal gear-wheel 14 freely rotatable upon one end thereof at a point outside of the U-shaped frame. This internal gear is adapted to mesh with a gear 16 mounted upon a freely rotatable tubular shaft 17, which shaft carries a bevel gear 18 at a point near its opposite end. This gear 18 is adapted to mesh with a bevel gear 19 mounted upon the end of a shaft 21 journaled as at 22 and 23 to the U-shaped member 5.

A worm 24 is mounted upon the opposite end of the shaft 21 and is adapted to mesh with a gear 26 rigidly secured to a tubular shaft 27. This tubular shaft 27 carries a collar 28 and is provided with a thread 29 upon which a nut 31 is adapted to screw. This tubular shaft 27 is mounted upon a spacer bolt 32, slidably secured in the extreme ends of the legs of the U-shaped member 5.

The manner of slidably securing this bolt is best shown in Figure 2 where a slot 33 is shown. A circular saw 33' is adapted to be mounted on the tubular shaft 27 between the collar 28 and the nut 31.

At 30 and 34 I have shown clips which are adapted to maintain sliding spikes 35 and 36 which spikes are connected to each other by a cross bar 40. The spike 36 carries upon one side thereof a rack 37 which is adapted to mesh with a gear 38 carried on one arm of the U-shaped member 5. A handle 39 is provided on the gear 38 for the purpose of rotating the same.

The manner of operating my device is, as follows:

The saw is placed against the breast of the operator and the handle 39 is grasped in his one hand while the handle 15 is grasped in the other hand. The gear 38 is then revolved so as to project or retract the spikes 35 and 36 until the saw has been brought into contact with the work to be operated upon.

The handle 15 and its internal gear 14 are then revolved, which transmits the motion through the gears 16, 18, 19 and worm gear 24, gear 26 to the shaft 27 and as the saw is carried thereon, the same will be rotated.

The saw may now be maintained at the proper depth with relation to the work being operated upon by slowly retracting the spikes 35 and 36 through the revolving of the gear 38 operated by the handle 39.

It will thus be seen that I have provided means whereby a circular saw may be operated by hand and that the depth of the cut may be easily regulated, or the amount of pressure exerted by the saw upon the work may be so regulated.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a manually operated saw, the combination with a U shaped frame, of a breast-plate secured to said frame, a shaft rigidly secured to said U shaped frame, an internal gear freely rotatable on said shaft and a gear meshing with said internal gear, a shaft secured to said gear, a beveled gear mounted on said last named shaft, a bevel gear adapted to mesh with said first-mentioned bevel gear, a shaft extending from said last mentioned gear parallel with said U shaped frame, a worm gear mounted on the opposite end of said last-mentioned shaft, a removable shaft secured in the free ends of said U shaped member carrying a gear meshing with said worm and a saw removably secured to said last-mentioned shaft.

2. In a manually operated saw, the combination with a U shaped frame, of a breast-plate secured to said frame, a shaft rigidly secured to said U shaped frame, an internal gear freely rotatable on said shaft, and a gear meshing with said internal gear, a shaft secured to said gear, a beveled gear mounted on said last mentioned shaft, a bevel gear adapted to mesh with said first-mentioned bevel gear, a shaft extending from said last mentioned gear parallel with said U shaped frame, a worm gear mounted on the opposite end of said last mentioned shaft, a removable shaft secured in the free ends of said U shaped member carrying a gear meshing with said worm, a saw removably secured to said last-mentioned shaft, spikes longitudinally movable on said U shaped member, and means for moving said spikes with relation to said U shaped member.

3. In a device of the character described, the combination with a U shaped member, of a breast-plate secured to said U shaped member, a saw positioned between the ends of said U shaped member, slots formed in the ends of said U shaped member, a shaft removably secured in said slots, said shaft adapted to rotate said saw, spikes secured to each arm of said U shaped member, a rack upon one of said spikes, a gear rotatably mouned upon one arm of said U shaped member, and means for rotating said gear.

In testimony whereof I affix my signature.

ALBERT L. GRAY.